United States Patent [19]

Fleurier

[11] 4,249,242
[45] Feb. 3, 1981

[54] DEVICE FOR MONITORING MEAN OPERATING CONDITIONS

[75] Inventor: Gérard Fleurier, Levallois-Perret, France

[73] Assignee: Jaeger, France

[21] Appl. No.: 85,385

[22] Filed: Oct. 16, 1979

[30] Foreign Application Priority Data

Oct. 19, 1978 [FR] France ............................ 78 29786

[51] Int. Cl.$^3$ .............................................. G01F 9/02
[52] U.S. Cl. ...................................... 364/442; 73/114
[58] Field of Search .................. 364/442; 73/114, 113, 73/112, 115; 235/92 FL

[56] References Cited

U.S. PATENT DOCUMENTS

| 3,967,097 | 6/1976 | Moretti | 364/442 |
| 3,983,372 | 9/1976 | Klaver | 364/442 |
| 4,050,295 | 9/1977 | Harvey | 364/442 X |
| 4,054,781 | 10/1977 | Kuno et al. | 364/442 |
| 4,122,811 | 10/1978 | Bowler et al. | 364/442 X |
| 4,136,389 | 1/1979 | Vogel | 364/442 |

Primary Examiner—Edward J. Wise
Attorney, Agent, or Firm—Thomas J. Greer, Jr.

[57] ABSTRACT

The invention relates to rating monitoring devices.

A first circuit emits a pulse for each centiliter (cl) of fuel consumed by a vehicle. A second input circuit emits a pulse for each meter travelled, the pulses being accumulated in a count meter. A store circuit stores a certain number of values previously contained in the count meter at the moment of the preceding pulses of cl consumed. Information about the mean distance travelled per 10 cl of fuel is obtained by producing the difference between the content of the count meter or that if the first register in a register battery, and the content of the last register of the battery. A divider allows this information to be converted into mean consumption per 100 km, this consumption being displayed in a display device.

This invention finds application, in particular, to car.

10 Claims, 5 Drawing Figures

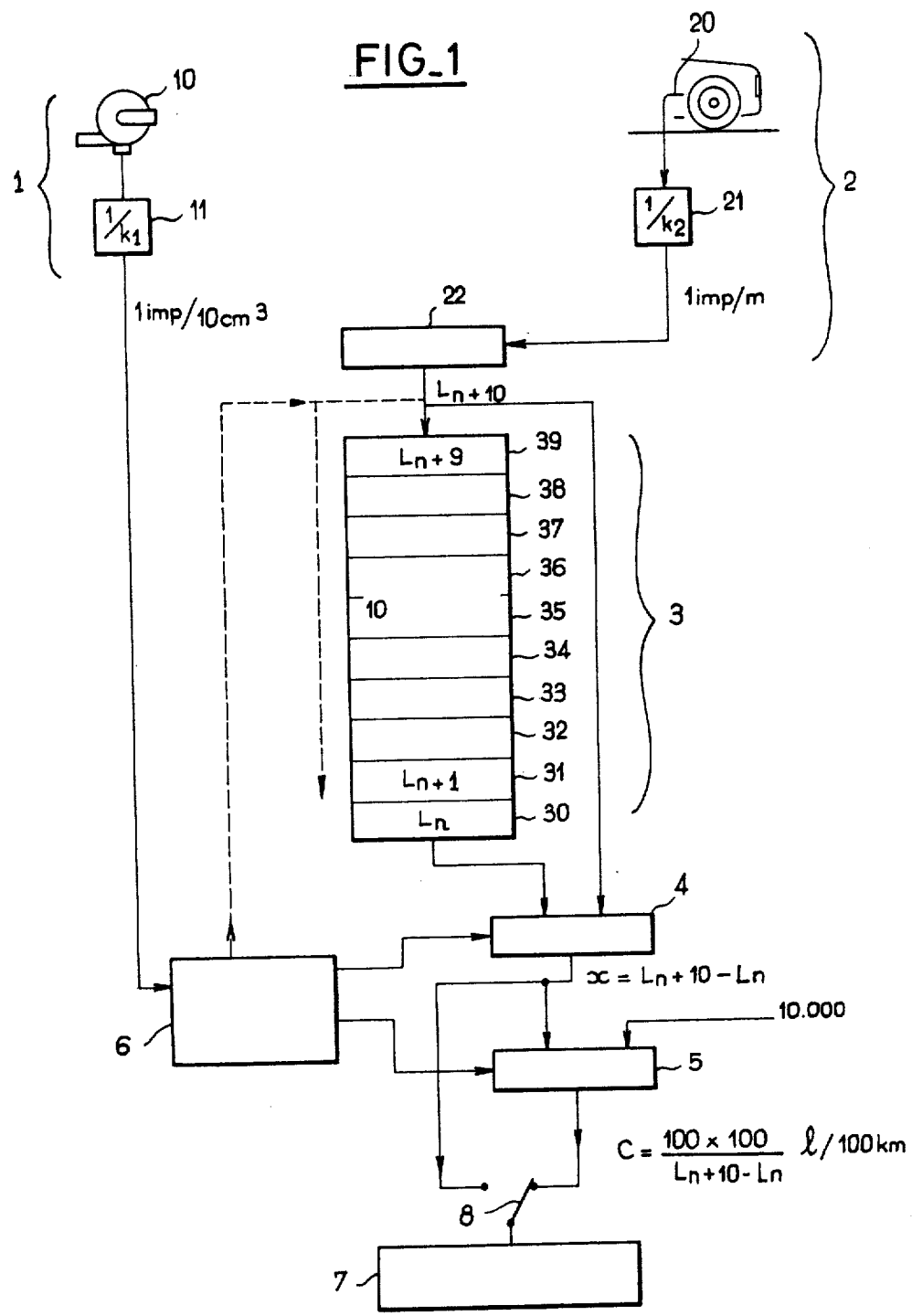

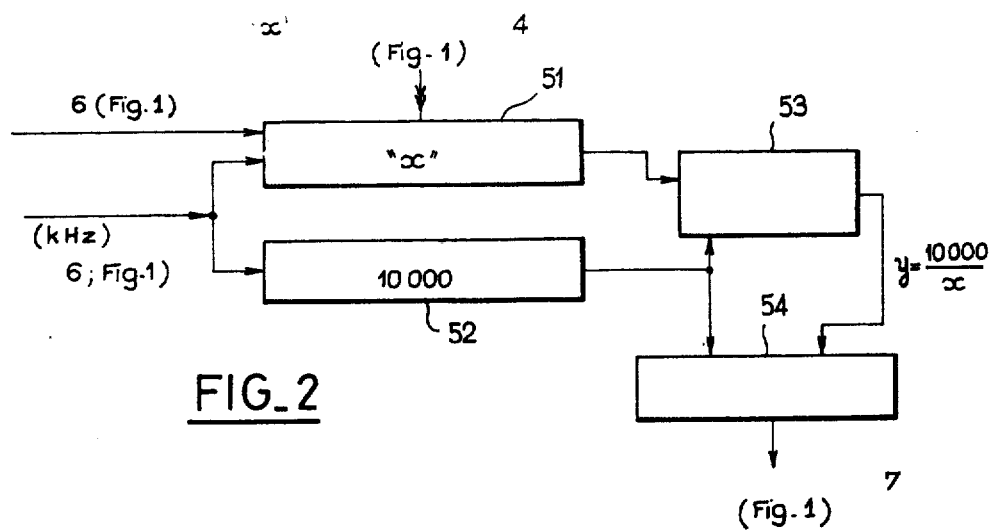
FIG_2
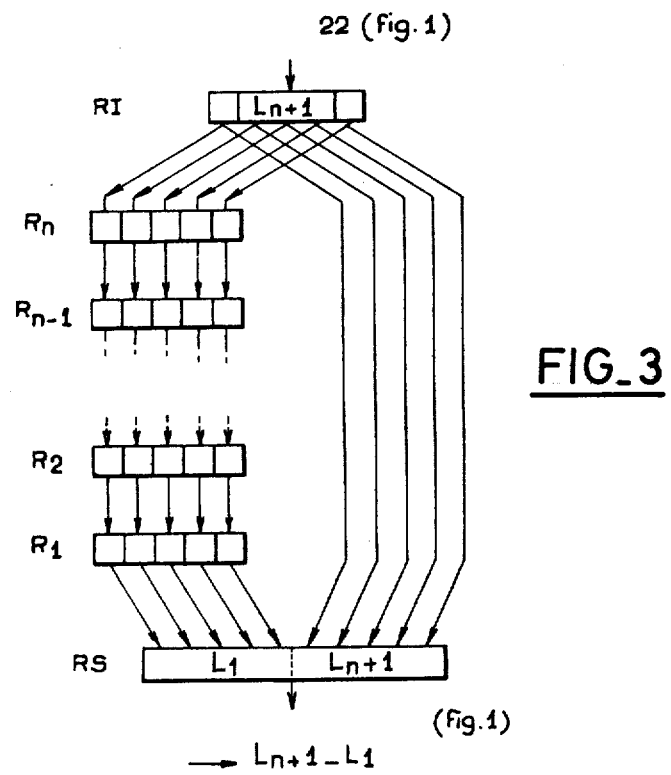
FIG_3

DEVICE FOR MONITORING MEAN OPERATING CONDITIONS

BACKGROUND OF THE INVENTION

The present invention relates to rating monitoring devices and applies in particular to vehicles as well as to any devices in which the physical parameters or quantities vary conjointly.

The car industry provides some simple examples of rating monitors, in particular speedometers and revolution counters which both simply virtually instantaneous information. There is a tendency nowadays to give the user more elaborate information, taken as a mean value, that is to say integrated over a certain time interval. An example of this is the mean consumption or mean speed. This tendency is apparent not only with regard to vehicles but also with regard to other mass-produced and-/or widely distributed products or devices.

This need can be satisfied by means of electronic devices generally comprising two input circuits which emit signals each representative of physical quantities which vary conjointly, such as for example, the distance travelled, the fuel consumption, the number of revolutions of an engine, or the time, as well as processing means for continually determining the rate of change of one of the physical quantities relative to the other.

One particular problem arises in practice. By nature of the operation, mean operation must entail a significant initial advance of the relevant physical quantities to allow the insignificant or undesireable fluctuations to disappear. A large storage capacity is therefore needed to keep a record of this initial advance.

Unfortunately, this increases both the complexity and the cost price of the devices used, and these two factors are important in the mass-production of widely distributed articles. Real problems are encountered in the choice of a practical compromise.

Another difficulty which is added to the first one lies in the fact that digital electronic devices have sequential operation. As mentioned above, the mean has to be produced over long time intervals so as to allow any inadvertent fluctuations in the relevant physical quantities to disappear. On the other hand, it is desirable to renew the result indicated after short time intervals so as to avoid discontinuity in the result, which is just as disagreeable for the user.

SUMMARY OF THE INVENTION

The present invention allows, in particular, this double problem to be solved.

According to a first feature of the invention, a first input circuit is arranged so as to emit successive pulses, each pulse indicating that the first physical quantity has varied by a predetermined quantum since the preceding pulse, a second input circuit comprises an integrating meter arranged so as to contain a varying instantaneous total as a second physical quantity, the general rate of incrementation of this meter being much faster than the general rate of the pulses emitted by the first input circuit, and processing means comprise a group of stores and an associated store control member, this control member reacting to each pulse emitted by the first input circuit by transferring a predetermined portion of the instantaneous total in the meter into one of the stores while eliminating the oldest total recorded in the stores, and a subtractor which can be excited so as to supply the difference between a recent total contained in the meter or one of the stores and a former total contained in one of the stores, the quantity available at the output of the subtractor each time representing the mean rate of change of the second physical quantity as a function of the first.

In an embodiment of the invention, the processing means also comprise a dividing member which is connected to the output of the subtractor and is capable of forming the inverse of the quantity available at the output thereof, thus providing an output quantity representing the mean rate of change of the first physical quantity as a function of the second.

In a preferred embodiment, the portion of the total which is transferred from the meter to the stores comprises the last significant digits of the meter.

In addition, the mean rating monitor very advantageously comprises a means of displaying the output quantity of the processing means.

Other features and advantages of the invention will appear on reading the following detailed description which is given with reference to the accompanying drawings and to illustrate, but not limit, various embodiments of the present invention.

BRIEF DESCRIPTION OF THE DRAWINGS

FIG. 1 shows a simplified electrical diagram of a preferred embodiment of the present invention.

FIG. 2 shows a detailed embodiment of the divider 5 in FIG. 1.

FIGS. 3 to 5 show alternative embodiments of the store assembly 3 in FIG. 1.

DETAILED DESCRIPTION OF THE DRAWINGS

Figure 4:
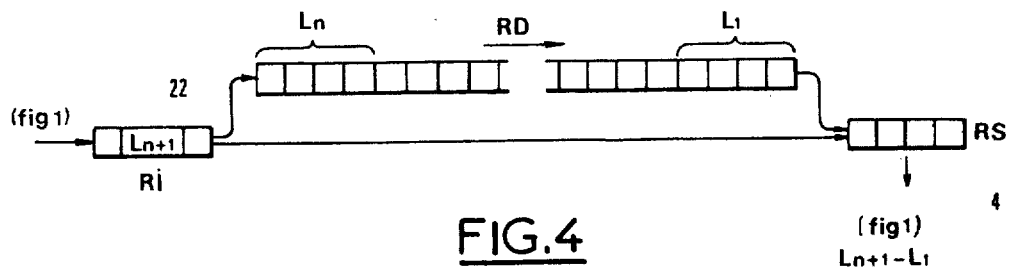

Two input circuits are designated by the reference numerals 1 and 2 respectively in FIG. 1.

The first input circuit 1 comprises a flowmeter 10 which emits successive pulses each corresponding to a predetermined quantity of consumed fuel. This flowmeter is, for example, of the piston or screw-propeller type.

The flowmeter 10 is followed by a meter 11 which divides the fuel pulse frequency by a predetermined factor $k_1$. The factor of division $k_1$ is selected such that a pulse appears at its output for every 10 cm$^3$ of fuel consumed.

The second input circuit 2 comprises a distance transmitter 20. This is, for example, of the type having flexible blade switches controlled by a multipolar magnet.

If necessary for this arrangement of the distance transmitter, a correction is made to take into account the differing transmission ratios which can be used. This distance transmitter itself also delivers a pulse each time a predetermined distance has been travelled by the vehicle. Here again the pulses from the distance transmitter 20 are fed to a meter 21 which divides the number of pulses by a factor $k_2$. The factor $k_2$ is selected such that one pulse is obtained per meter travelled by the vehicle at the output of the meter 21.

The second input circuit also comprises a meter 22 which adds up indefinitely the distance travelled by the vehicle. This means that, after reaching its limit, the count meter 22 returns immediately to zero and continues to add up the distance.

Alternatively, the second input circuit can comprise a distance transmitter of a different type, connected to a meter in such a way that the meter adds up the distance indefinitely in the manner just described.

The device according to the invention also comprises an assembly of stores designated by the general reference numeral 3. There are ten of these stores here, designated by reference numerals 30 to 39 and arranged in a battery of ten registers. The meter 22 is connected directly to the first register in the battery, bearing reference numeral 39.

This battery of registers is provided, in a manner known per se, with a transfer and shift control which allows a new quantity to be introduced into the first register of the battery while transferring the content of the different registers into the next one, having a reference numeral which is one unit lower. The content of the last register in the battery, designated by 30, disappears in this operation.

In the present invention, this transfer and shift control is effected from the output of the meter 11 forming part of the first input circuit.

Thus each pulse from the meter 11, denoting the consumption of a centiliter (cl), is fed to a control clock and logic circuit 6 which acts on the register battery so as to transfer the content of the meter 22 into the first register 39 at the same time as the content of this register 39 is transferred into the register 38, and so on until the content of the register 31 is transferred into the register 30 and the former content of the register 30 is cleared.

Once the device has started up and once ten pulses of cl of fuel consumed have been produced, the said registers 30 to 39 contain, in order, an increasing succession of the distance value. The difference between the two distances contained in two adjacent registers defines the distance travelled per 10 $cm^3$ of fuel.

According to the invention, a subtractor 4 produces the difference between a value of the distance which is already old and is contained in the bottom of the battery of registers, and a recent distance value contained in the first registers of the battery or even in the meter 22.

It is seen that the output of the subtractor 4 is thus representative of the mean distance travelled by the vehicle with a quantity of fuel which is determined by the number of pulses of cl consumed which have elapsed between the former distance value and the recent distance value. This number of pulses is stored by the manner in which the distance values are registered in the store 3.

The subtractor 4 is also controlled by the control clock and logic circuit 6, preferably by means of the pulses of cl consumed.

An embodiment of the invention also allows the inverse ratio, that is to say the mean fuel consumption as a function of the distance, to be obtained in a simple manner. For this purpose, the output of the subtractor 4 is fed to a divider circuit 5 which is also controlled by the control clock and logic circuit 6. The divider circuit 5 divides a predetermined quantity, 10,000 in this case, by the output quantity of the subtractor 4. The output of the divider 5 is thus a digit representing the consumption in liters per 100 km, which a skilled man could easily check.

The device according to the invention is advantageously completed by a display circuit 7 which can be connected via a switch 8 either to the output of the divider 5 or to the output of the subtractor 4 so as to display either the mean consumption as a function of the distance or the mean distance travelled with a given consumption.

Thus, by using the output of the divider 5, the instantaneous linear consumption evaluated in an interval of consumption of 100 $cm^3$ and expressed in liters per 100 km is obtained. The value displayed is updated every centiliter.

It will be observed that the number of bits in each register constituting the store 3 can be much lower than the capacity of the meter 22. In fact, it is sufficient for the capacity of each of the registers to be at least equal to the greatest difference which can be envisaged between the oldest value contained in the register 30 and the most recent value contained in the meter 22 (the latter being reduced to the same number of significant bits as the register 30). In this way, there will not be more than one shift in the time interval during which the content of the meter passes through the battery of registers until it reaches the register 30. The content of the subtractor 4 faithfully represents the desired difference under these conditions. This substantially reduces the size of the registers needed to carry out the present invention. The practical choice of the capacity of the registers depends on the particular application envisaged. In the case illustrated in FIG. 1, the capacity of the different registers of the store 3 is selected according to the distance which the vehicle can travel with 10 cl of fuel.

For its part, the meter 22 can be used for other purposes, so it will have some digits which are more significant as well as some digits which are less significant than those needed for the battery of registers. However, in practice, it could be sufficient to remove a portion of the content of the meter 22 and transmit it to the battery of registers. This portion will be reduced most of the time to the least significant digits contained in the meter 22.

A particular embodiment of the divider 5 shown in FIG. 1 will now be described with reference to FIG. 2.

In this embodiment, the divider 5 comprises a programmable meter 51 which is charged under the control of the control clock and logic circuit 6 in FIG. 1 with the output quantity from the subtractor 4, now designated by x. The divider circuit also comprises a meter 52 which divides by 10,000. The two meters 51 and 52 are pulsed by a predetermined clock frequency supplied by the circuit 6 in FIG. 1 and equal, for example, to $f = 100$ KHz.

The divider also comprises a meter 53 which is initially reset to zero by the circuit 6 in FIG. 1 with the aid of a connection which is not shown. Once the meter 53 has been reset to zero, it is connected by its counting input to the output of the programmable meter 51 so as to advance by one step each time the output of this meter reaches the value x. This takes place until the output of the meter 52 reaches the value 10,000, at which the meter 53 is stopped, and its content transferred into a store 54, in a manner which is controlled by the output of the meter 52. The store 54 is connected to the display circuit 7, directly or by means of the above-mentioned switch 8.

It is seen that, once the meter 52 has reached the value 10,000, the content of the meter 53 is a quantity expressing "in 10,000, how many times x?," that is to say that the content of this meter 53 represents the quotients of 10,000 by x. This value, which expresses the consumption in 100 kms as mentioned above, is transferred into the store 54 and then displayed.

In practice, the capacity of the meter 52 could be increased by one or two decased to produce one or more digits after the decimal point in the meter 53.

The clock frequency fed to the meters 51 and 52 does not affect the result of the division. It merely defines the speed at which the division is performed. Of course, this clock frequency will be selected sufficiently high for division to be performed at a rate which is compatible with the rate of renewal of the output of the subtractor. For this purpose the assembly is monitored by the control clock and logic circuit 6 in FIG. 1.

Figure 5:
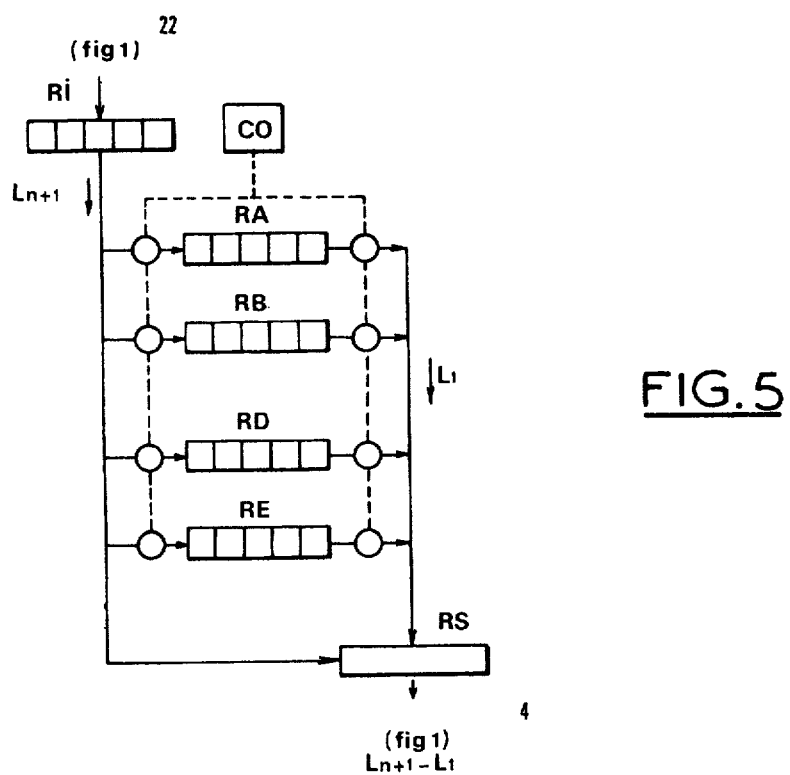

FIGS. 3 to 5 show three alternative embodiments of the circuit of the store 3 in FIG. 1.

In FIG. 3, the store circuit still comprises a battery of registers $R_n$ to $R_1$. An intermediate register $R_1$, which has the same capacity as the registers $R_1$ to $R_n$ and is connected between the meter 22 and this battery of registers, is now added to it. The stores are completed with one output register RS which receives the content of the last register $R_1$ of the battery as well as the content of the intermediate register $R_1$. Of course, this output register RS has twice the capacity of the others. And this output register RS acts as the only interface with the subtractor 4 which thus only has to produce the difference between the quantities contained in the two halves of the output register RS.

This embodiment with the intermediate register and output register has the advantage of ensuring the permanence of the quantities fed to the subtractor, and this is of interest in certain applications where the operation of the subtractor are carried out at a slow rate.

FIG. 4 shows a very simple variation on FIG. 3. Instead of being arranged in registers $R_1$ to $R_n$ in a battery, the contents of which are transferred in parallel, the group of stores used is arranged in a large shift register in which the transfers are carried out step by step. By designating as b the number of bits in the intermediate register $R_1$, the advance controlled by each pulse of cl consumed will define b steps in the large shift register. The output register RS is constituted by two registers of the same capacity as the intermediate register $R_1$ arranged in parallel. One of these registers receives the content of this register $R_1$ directly by b steps of shift, whereas the other portion of the register S receives the content $L_1$ coming from the downstream portion of the large shift register RB.

The assembly of stores can also be produced in a third manner, illustrated in FIG. 5. In this case, the assembly of stores comprises a plurality of registers RA, RB ... RD, RE which can be addressed individually under the control of an address meter CO. This address meter CO is fed with one unit at each pulse of cl consumed, its capacity being equal to the number of registers, and its return to zero being automatic. This address meter designates permanently the register in which the oldest value of the integrated distance is located and into which the most recent value will be transferred at the moment of the following pulse of cl consumed.

Thus, the output register RS will receive, on the one hand, the content of the intermediate register $R_1$ and, on the other hand, the content of that store at present designated as the oldest by the address meter CO.

The output of the register RS is fed to the subtractor 4 in FIG. 1, in the manner described above.

The detailed description given above illustrates the present invention in its preferred application, metering the mean consumption of fuel. This preferred application shows clearly the advantages of the invention, since the means distance travelled with a predetermined quantity of fuel, or the quantity of fuel needed to travel a predetermined distance can be obtained without any reference to the time. This being so, the invention can also be applied for monitoring the mean distance travelled as a function of the time, and optionally the mean quantity of fuel consumed per unit time. Moreover, the present invention is not strictly limited to the car industry and applies to all other types of land, sea and air vehicles.

The invention also applies in a more general manner to any device in which the parameters of the physical quantities vary conjointly and in a monotonic manner, one as a function of the other, expecially in the case of mass-produced and/or widely distributed apparatus. Possible applications of this type include, for example, the mean electricity consumption of a domestic or industrial installation, the monitoring of the number of public transport users, etc. In this sense, the word "rating" as is used in the present patent application to designate in a general manner any relationship between two physical quantities varying conjointly in a substantially monotonic manner, without it being limited to the rating of engines and other machines.

What is claimed is:

1. A mean rating monitor comprising two input circuits delivering signals which respectively represent first and second physical quantities which vary conjointly, and processing means for determining continually the rate of change of one of the physical quantities relative to the other, the improvement comprising the first input circuit being adapted to emit successive pulses, each indicative of a predetermined quantum variation in said first physical quantity from the preceding pulse, the second input circuit comprising an integrating meter provided to contain a varying instantaneous total as the second physical quantity, the general incrementation rate of said integrating meter being much faster than the general rate of the pulses emitted by the first input circuit, and the processing means comprising a group of stores and an associated store control member, said control member transferring a predetermined portion of the instantaneous total from the meter into one of the stores, in response to each pulse emitted by the first circuit while eliminating the oldest total registered in the stores, and a subtractor which is excitable so as to supply the difference between a recent total contained in the integrating meter or one of the stores and a former total contained in one of the stores, the quantity available at the output of the subtractor representing each time the mean rate of change of the second physical quantity as a function of the first physical quantity.

2. A mean rating monitor according to claim 1, wherein the processing means further comprise a dividing element which is connected to the output of the subtractor and is capable of forming the inverse of the quantity available at the output thereof, thereby producing an output quantity representing the mean rate of change of the first physical quantity as a function of the second physical quantity.

3. A mean rating monitor according to claim 1 wherein the stores are arranged in a battery of registers, and each pulse of the first input circuit simultaneously controls the transfer of the total in the integrating meter into the first register of the battery as well as the advance of the totals already registered from one register to the next, while the oldest total contained in the last register in the battery is cleared.

4. A mean rating monitor according to 1 wherein the stores are arranged in a single shift register and each pulse from the first input circuit controls the advance of the content of this single register by a predetermined number of steps, as well as the transfer of the content of the integrating meter into the first stages of the single register.

5. A mean rating monitor according to claim 1 wherein the stores form part of a store addressable in writing or reading mode which comprises an address control element for causing the addresses to be allocated to the order of registration of the totals of the integrative meter of the stores, and each pulse from the first input circuit controls the transfer of the present total of the integrating meter into the store containing the oldest total, while simultaneously acting on the address control element so as to modify the correspondence between the addresses and the order of registration of the totals.

6. A mean rating monitor according to claim 3, 4, or 5, further comprising an intermediate register forming a buffer store between the meter and the plurality of stores.

7. A mean rating monitor according to one of claim 1 wherein the first input circuit comprises a meter—dividing the frequency of the pulses produced thereby.

8. A mean rating monitor according to claim 1 wherein the second input circuit, in turn further comprises a means arranged so as to emit successive pulses, each pulse indicative of a predetermined quantum variation in said second physical quantity from the preceding pulse, these pulses being transmitted to the integrating meter.

9. A mean rating monitor according to claim 1 wherein the portion of the total from the integrating meter which is transferred into the stores is composed of the least significant digits of the integrating meter.

10. A mean rating monitor according to claim 1 further comprising an element for displaying the output quantity of the processing means.

* * * * *